United States Patent [19]
Opel

[11] Patent Number: 5,471,012
[45] Date of Patent: Nov. 28, 1995

[54] ELECTRICAL WIRE BOX APPARATUS

[75] Inventor: George E. Opel, Ambler, Pa.

[73] Assignee: Geo Ventures, Ambler, Pa.

[21] Appl. No.: 281,594

[22] Filed: Jul. 28, 1994

[51] Int. Cl.$^6$ ..................................................... H02G 3/08
[52] U.S. Cl. ............................................ 174/53; 174/58
[58] Field of Search ......................... 174/53, 58; 220/3.6

[56] References Cited

U.S. PATENT DOCUMENTS

| | | | |
|---|---|---|---|
| 2,063,923 | 12/1936 | Gries | 220/3.6 |
| 2,233,731 | 3/1941 | Budnick | 220/3.6 |
| 2,305,015 | 12/1942 | Langer | 220/3.6 X |
| 2,885,106 | 5/1959 | Miller | 220/3.6 |
| 3,140,425 | 7/1964 | Cade | 174/59 |
| 3,443,162 | 5/1969 | Nudelmont | 174/59 |
| 3,617,612 | 11/1971 | Patton | 174/59 |
| 3,617,811 | 11/1971 | McVoy | 317/99 |
| 3,716,651 | 2/1973 | Werner | 174/53 |
| 4,165,443 | 8/1979 | Figart | 174/53 |
| 4,336,418 | 6/1982 | Hoag | 174/53 |
| 4,428,492 | 1/1984 | Jorgensen | 220/3.94 |
| 4,857,669 | 8/1989 | Kitamura | 174/53 |
| 4,918,258 | 4/1990 | Ayer | 174/53 |

Primary Examiner—Kristine L. Kincaid
Assistant Examiner—David Tone
Attorney, Agent, or Firm—Eric A. LaMorte

[57] ABSTRACT

A wiring box assembly for an electrical fixture. The wiring box assembly includes a box structure, wherein the wires of an incoming electrical cable are retained within the box structure at a set orientation and position. A dielectric insert is positionable within the box structure. The dielectric insert envelops a plurality of conductive elements within the insert. Screws are driven through the insert into the incoming wires. The screws are conductive and therefor electrically couple the wires to the conductive elements within the dielectric insert. Backing off these screws, breaks the contact, thereby providing a safe, local disconnect point. The leads of the electrical fixture being mounted within the wiring box are joined to the dielectric insert with secondary screws. The secondary screws are driven into the insert and engage the conductive elements within the insert, thereby electrically coupling the leads of the electrical fixture to the incoming wires.

18 Claims, 8 Drawing Sheets

ELECTRICAL WIRE BOX APPARATUS

BACKGROUND OF THE INVENTION

1. Field of the Invention

The present invention relates to electrical boxes, such as switch boxes, junction boxes and outlet boxes used in domestic wiring applications. More particularly, the present invention relates to electrical boxes that contain conductive elements therein that interconnect with incoming wires and remove the need to couple individual wire strands within the box with tape or wire nuts.

2. Prior Art Statement

Most building codes require that all electrical junctions, outlets and switches in a domestic application must be contained within some form of fire retardant box. Traditionally, such boxes are made of metal or polyvinylchloride (PVC) and contain various punch-out structures that enable a variable number of wires to be led into the box. Such traditional boxes typically also include some form of clamp that engages the incoming wires and prevents the wires from being inadvertently pulled out of the box. Besides the clamp, traditional boxes do not engage the incoming wires. Rather, the sole function of traditional boxes is to shield the various incoming wires while the wires are interconnected by other means.

When wiring a domestic application, often wires of different gauge sizes and construction must be joined. For instance, solid 12 gauge wire must often be coupled with much thinner braided wire, or multiple thin wires must be joined to a much thicker common wire. The preferred method of joining various wires in a traditional box is through the use of Wire Nuts. Wire Nuts work well when joining two like wires, however they are very difficult to use in joining wires of differing gauges and construction. Consequently, such junctions must often be soldered or taped prior to the application of the Wire Nut. Both the professional and amateur electrician often experience difficulty in connecting a number of solid stiff wires to a number of stranded wires and being sure that all the wires are properly interconnected. Soldering and pretaping the wires are time consuming and are therefore rarely used. Accordingly, just the Wire Nut is relied upon to maintain the connection. These interconnections commonly fail as the wires are folded and forced into the confined space of a traditional wiring box.

Over the years many devices have been invented in an attempt to simplify the wiring of difficult types of electrical boxes. However, these prior art devices are typically application specific, and can only be used as either a switch box, an outlet box or a junction box. Prior art devices that show simplified outlet boxes are exemplified by U.S. Pat. No. 3,716,651 to Werner, entitled MINIMUM WIRE BOX AND DEVICE ADAPTERS; U.S. Pat. No. 4,165,443 to Figart, entitled POWER DISTRIBUTION SYSTEM and U.S. Pat. No. 4,336,418 to Hoag, entitled LAMINATED JUNCTION BOX MODULE AND LAMINATED PLUG-IN ACCESSORY MODULES SELECTIVELY USABLE THEREIN. Such prior art devices do not require Wire Nuts to connect wires. However, special outlet terminals must be used making the overall systems highly undesirable.

Examples of prior art junction boxes are shown in U.S. Pat. No. 3,443,162 to Nudelmont, entitled CURRENT DISTRIBUTOR; U.S. Pat. No. 3,140,425 to Cade, entitled ELECTRICAL CONNECTOR APPARATUS; and U.S. Pat. No. 3,617,612 to Patton, entitled ELECTRICAL JUNCTION MEANS. Each of these junction boxes eliminates the needs for Wire Nuts, however each is dedicated in its use and cannot be used as an outlet box or a switch box.

It is therefore an object of the present invention to provide a wiring box assembly that can be used as either a junction box, outlet box or switch box in a manner that does not require incoming wires to be bound by a Wire Nut, solder or tape.

It is a further object of the present invention to provide a box assembly that can be used as an outlet box or switch box without requiring a specially formed switch assembly or outlet.

It is a further object of the present invention to provide a box assembly that has a provision for a local disconnect of the power instead of having to trace the circuit and disconnecting the circuit at the main breaker panel.

It is still a further object of the present invention to provide such a box assembly that is easy to use, easy to install and relatively inexpensive to manufacture.

SUMMARY OF THE INVENTION

The present invention is a wiring box assembly for an electrical fixture. The wiring box assembly includes a box structure, wherein the wires of an incoming electrical cable are retained within the box structure at a set orientation and position. A variety of dielectric inserts are selectively positionable within the box structure. The dielectric inserts envelop a plurality of conductive elements. Screws are driven through the various inserts into the below lying insert or into the incoming wires. The screws are conductive and therefor electrically couple the wires to the conductive elements within the dielectric inserts. Power is disconnected by simply backing off the screws connecting the hot wire land the neutral wire to the conductive elements of the inserts. The leads of the electrical fixture being mounted within the wiring box are joined to a dielectric insert with secondary screws. The secondary screws are driven into the insert and engage the conductive elements within the insert, thereby electrically coupling the leads of the electrical fixture to the incoming wires.

BRIEF DESCRIPTION OF THE DRAWINGS

For a better understanding of the present invention, reference is made to the following description of exemplary embodiments thereof, considered in conjunction with the accompanying drawings, in which.

DETAILED DESCRIPTION OF THE INVENTION

Figure 1:
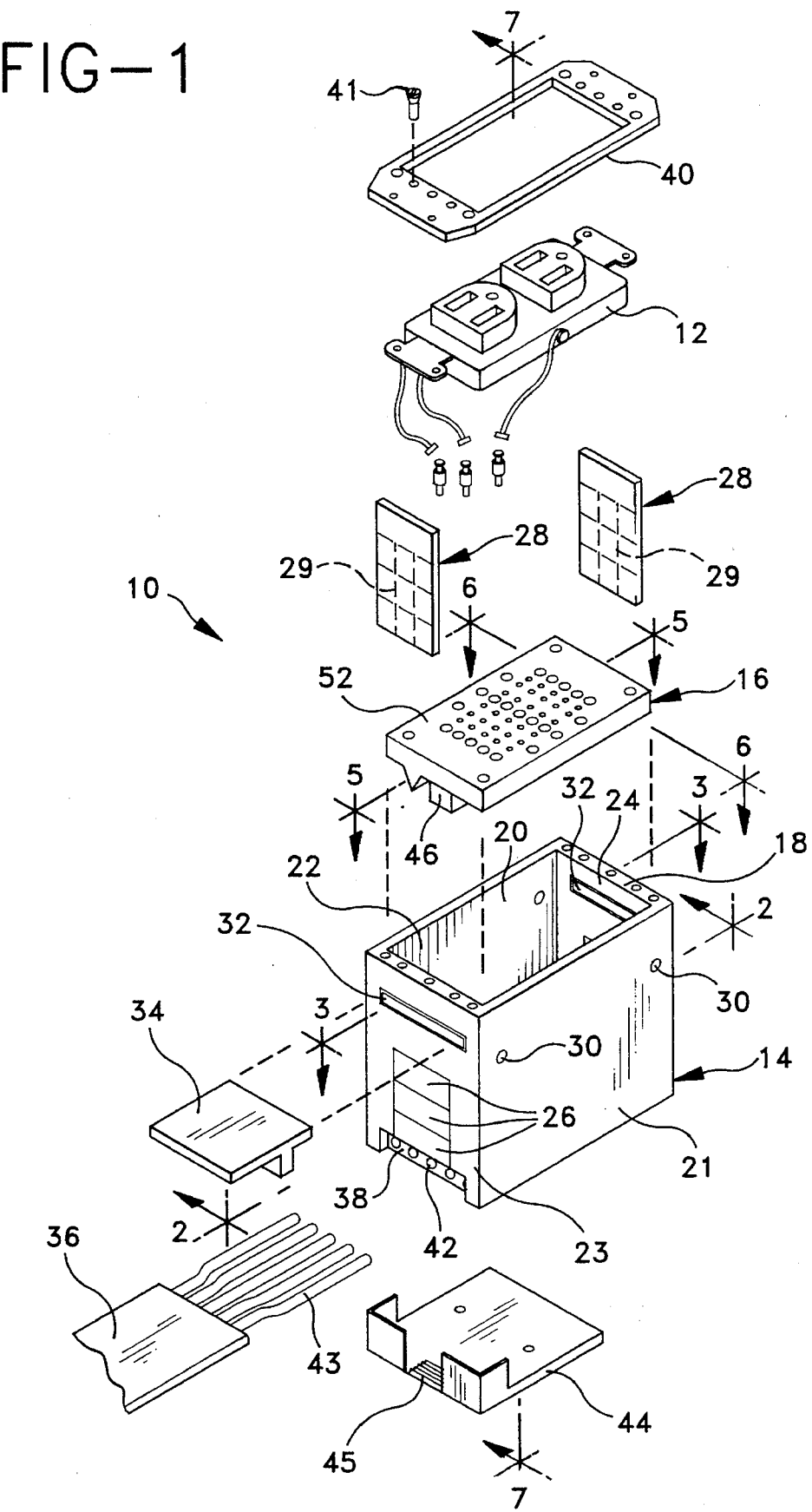
FIG. 1 is an exploded perspective view of one preferred embodiment of the present invention shown in conjunction with a residential electrical outlet to facilitate further consideration and discussion.

The present invention is an electrical box assembly that can be used as either as a junction box, switch box or outlet box. For the purposes of example only, FIG. 1 shows an application of the present invention as an outlet box, wherein a residential 120 volt electrical outlet is mounted within the box. Referring to FIG. 1, there is shown the present invention electrical box assembly 10 in conjunction with a residential electrical outlet 12. The electrical box assembly 10 includes primarily a box structure 14 and a master insert element 16. Other optional components also shown in FIG. 1 will be later discussed as each component is individually described.

Figure 2:
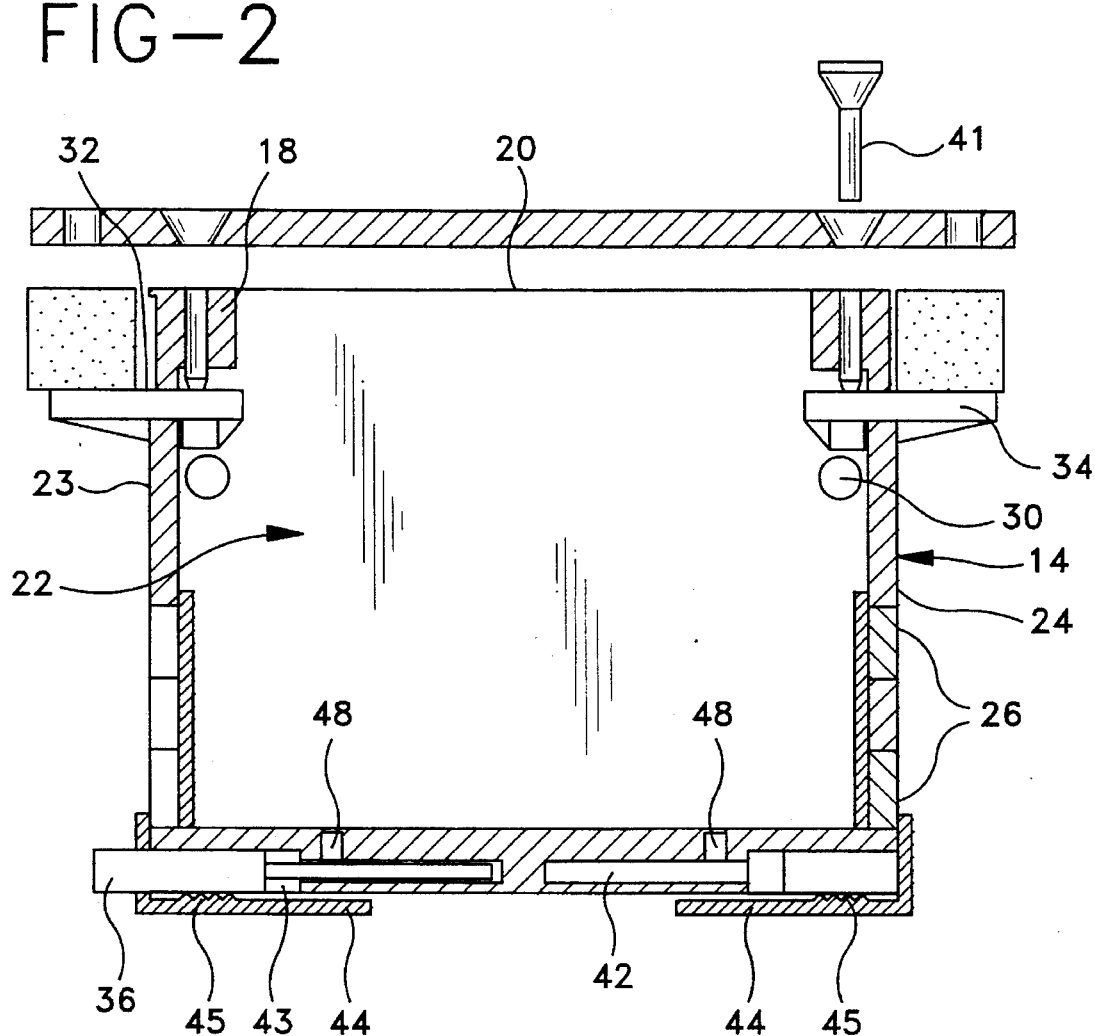
FIG. 2 is a cross-sectional view of the box structure component of the present invention, as shown in FIG. 1, viewed along section-line 2—2.

Referring to FIG. 2 in conjunction with FIG. 1, it can be seen that the box structure 14 is a mostly enclosed structure having a top surface 18 that defines a large opening 20. In the shown embodiment, the box structure 14 has two long side walls 21, 22 and two shorter end walls 23, 24, that provide the box structure 14 with a generally rectangular shape common to traditional prior art outlet boxes. Three cable knock out openings 26 are disposed on the end walls 23, 24 of the box structure 14. The cable knock out openings 26 are coupled to the overall box structure 14, however may be partially stamped or molded with a thin or perforated peripheral edge that enables any one of the cable knock out openings 26 to be easily removed. The openings are larger than are required for ease of working. Two, self-adhering closures 28 are provided to seal off the excess space surrounding a cable after the cable has been inserted through one of the cable knock out openings 26. The self-adhering closures 28 can be applied either to the outside surface or the inside surface of the box structure 14 using any permanent adhesive backing. The self-adhering closures 28 have perforations 29 that allow segments of the self-adhering closures 28 to be selectively removed. This enables the self-adhering closure 28 to be altered in shape as desired to optimally fit around incoming cables and other elements that the self-adhering closure may encounter.

In the shown embodiment, there are three cable knock out openings 26 on each short end wall 23, 24. The three cable knock out openings 26 are parallel and are disposed in a horizontal orientation. It will be understood that the number and orientations of such knock out openings are merely exemplary and any other number or orientation may be used.

The box structure 14 is mounted to a wall or framing stud in one of two manners. First, nail apertures 30 are disposed through the long side walls 21, 22 of the box structure 14. The nail apertures 30 enable nails to pass through the box structure 14 and join the box structure 14 to a framing stud. The use of nail apertures in electrical boxes is well known and is the traditional method of anchoring an electrical box in place. The second method of anchoring the box structure 14 in place is novel to the present invention. Knock out slot closures 32 are disposed on the short end walls 23, 24 of the box structure 14 at points proximate the top surface 18. When the knock out slot closures 32 are removed, open slots reside in the shorter end walls 23, 24 that are shaped to receive rocker inserts 34. As can be seen from FIG. 2, when the rocker inserts 34 are placed in the slots, the rocker inserts 34 partially extend both into and out of the box structure 14. When the cover plate 40 is joined to the box structure 14, the screws 41 used to join the cover plate 40 to the box structure 14 engage the rocker insert 34 within the box structure 14. This causes the rocker insert 34 to tilt which creates a clamping effect between the portion of the rocker insert 34 that extends out of the box structure 14 and the cover plate 40. If the drywall or other wall material is disposed in between the cover plate 40 and the rocker insert 34 (as shown in FIG. 2), the wall material is compressed and the box structure 40 becomes anchored in place to the wall material. In the shown embodiment, the screw 41 that joins the cover plate 40 to the box structure 14 also contacts the rocker insert 34. It should be understood that set screws can be passed through the top surface 18 of the box structure 14 that engage the rocker insert 34 but do not engage the cover plate 40.

In FIG. 1, the wires of an electric cable 36 are placed within the base 38 of the box structure 14. In the shown embodiment, five wires 43 are contained within the cable 36. However, it will be understood that two, three, or four cables may also be selectively used. Wire apertures 42 are disposed within the base 38 that are intended to receive the wires 43 within the electric cable 36. A locking cover 44 attaches to the base 38 of the box structure 14 over the electric cable 36. The locking cover 44 compresses the electric cable 36 against the base 38 of the box structure 14, thereby anchoring the electric cable 36 in place relative to the box structure 14. In the shown embodiment, locking teeth 45 extend upwardly from the locking cover 44. The locking teeth 45 engage the soft sheathing of the electrical cable 36 and prevent the cable 36 from being accidentally pulled out of the box structure 14. A similarly formed set of locking teeth may also be positioned on the underside of the box structure 14. As such, the electrical cable 36 may be engaged by locking teeth from both sides as it is joined to the box structure.

Figure 3:
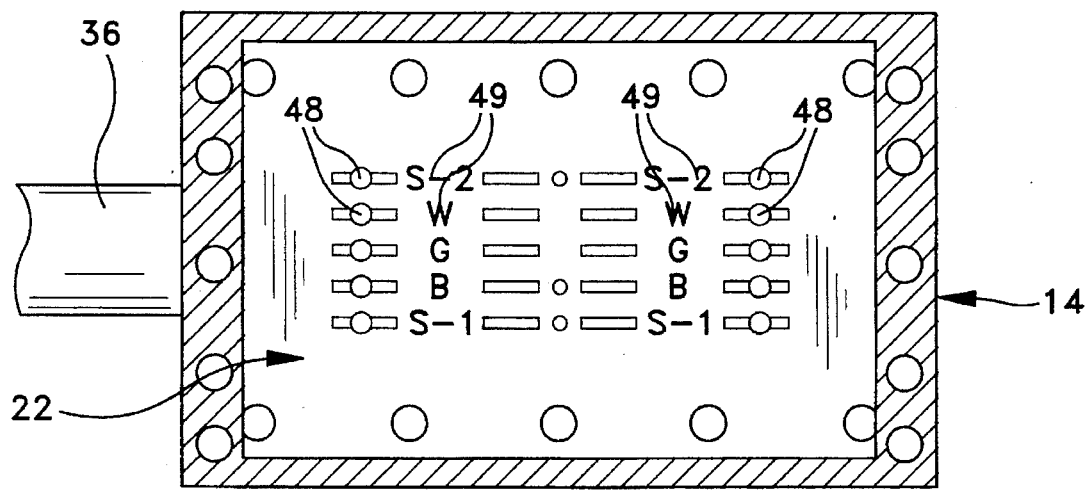
FIG. 3 is a cross-sectional view of the box structure component of the present invention as shown in FIG. 1, viewed along section line 3—3.

Referring to FIG. 2 in conjunction with FIG. 3, it can be seen that contact apertures 48 are formed in the base 38 of the box structure 14. The contact apertures 48 extend partially through the base 38 of the box structure 14 and communicate with the five wire apertures 42 on either side of the box structure base 38. Optional indicia 49 are provided that identify the wire aperture 42 into which the contact aperture 48 extends. In the shown embodiment, there are five wire apertures 42 on either side of the box structure 14. Accordingly, there are five contact apertures 48 disposed at each end of the base 38 of the box structure 14. The use of five wires and five contact apertures is exemplary and it will be understood that any other desired number may be used. In FIG. 3 the contact apertures 48 are identified with indicia 49 that identify each contact aperture 48 as corresponding to a ground wire, hot wire, neutral wire or spare wire. The indicia 49 correspond to the wires 43 from the electrical cable 36 present within the wire apertures 42 in the base 38. Thus, the contact aperture 48 identified as "Green—Ground" extends into the wire aperture 42 that holds the green ground wire of the electric cable 36. Similarly, the contact aperture identified as "Black—Hot" extends into the wire aperture 42 that holds the black hot wire from the electric cable 36, etc.

Figure 4:
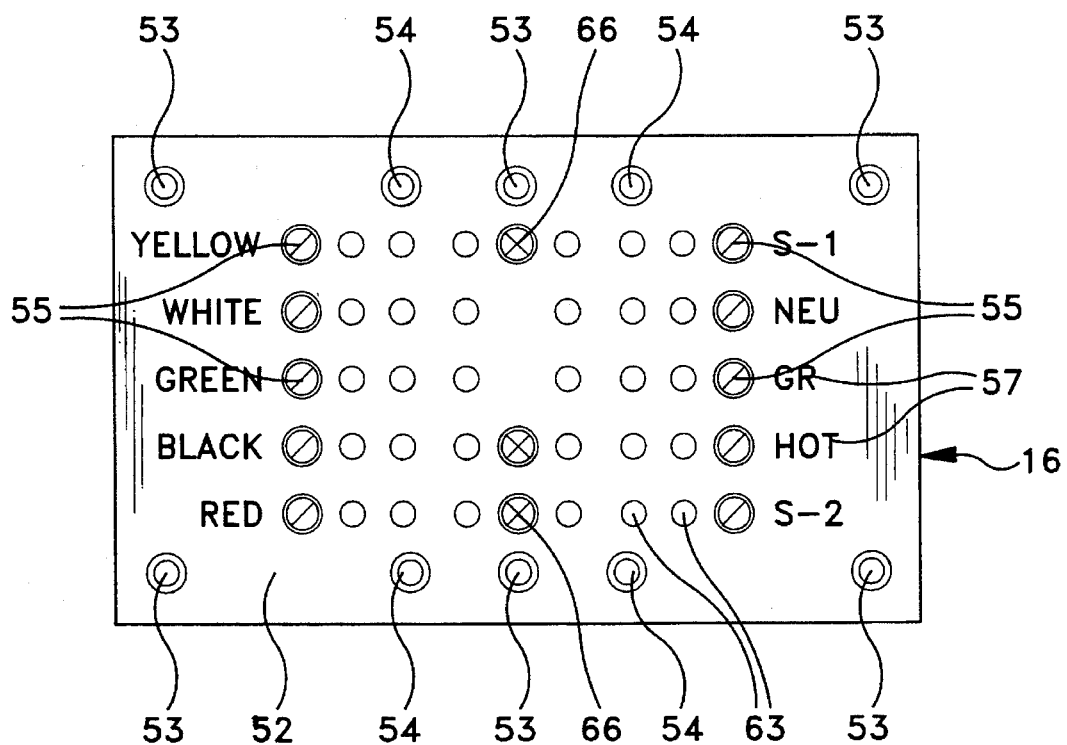
FIG. 4 is top view of the master insert element component of the present invention.

Returning to FIG. 1, it can be seen that the master insert 16 contains a number of holes on its top surface 52. Referring to FIG. 4, it can be seen that five different types of holes are present. Each type of hole is shaped to receive a specific type of screw that serves a dedicated function. The large holes 53 that are formed along the periphery of the master insert 16 are adapted to receive self-tapping screws (not shown) that couple the master insert 16 to the base 38 (FIG. 3) of the box structure 14. Secondary holes 54 are disposed in between some of the large holes 53 and are used to couple other inserts to the master insert 16 as will be later explained. Enabling screw holes 55 are aligned on either side of the master insert 16. When the master insert 16 is placed within the box structure 14 (FIG. 3), the enabling screw holes 55 align above the contact apertures 48 present in the base 38 of the box structure 14. Indicia 57 may be present on the master insert 16 proximate the enabling screw holes 55. In the preferred embodiment, the indicia 57 for identifying the enabling screw holes 55 matches the indicia 49 for the contact apertures 48 over which the enabling screw holes 55 align.

Figure 5:
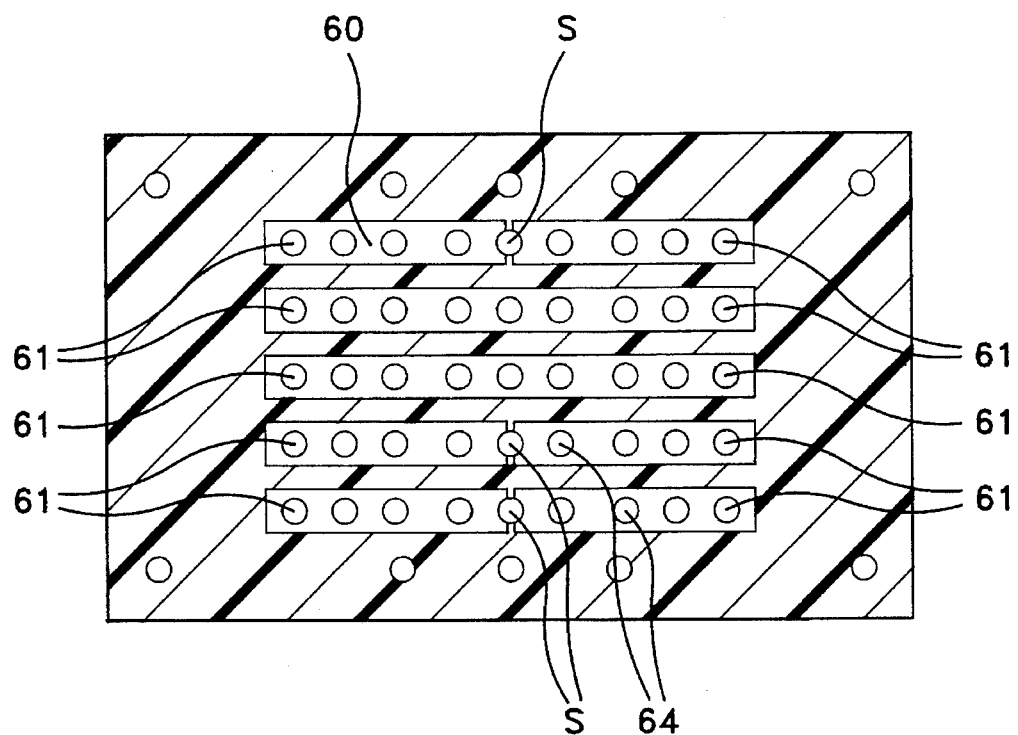
FIG. 5 is a cross-sectional view of the master insert as shown in FIG. 1 viewed along section line 5—5.

The master insert 16 is made of a dielectric material such as plastic or ceramic. Referring to FIG. 5 in conjunction with FIG. 4, it can be seen that conductive strips 60 are disposed in the center of the master insert 16. Each of the conductive strips 60 contains a threaded aperture 61 at its end that communicates with at least one of the enabling screw holes 55. As a result, if a screw were placed in one of the enabling screw holes 55, the screw would threadably engage the threaded aperture 61 in one of the conductive strips 60. Each conductive strip 60 also contains other threaded apertures 64 disposed in between the end threaded apertures 61. In the shown embodiment, some of the conductive strips are solid while others are divided into two. The purpose of such a construction will be later explained.

Connector holes 63 are disposed on the top surface 52 of the master insert 16. The connector holes 63 align over the threaded apertures 64 within the conductor strips 60. As a result, by screwing a conductive screw into a connector hole 63 in the master insert 16, that conductive screw will become electrically coupled to a conductive strip 60 contained within the master insert 16 as the conductive screw threads into one of the threaded apertures. Bridging holes 66 are also disposed on the top surface 52 of the master insert 16. The bridging holes 66 align over the splits S present in some of the conductive strips 60. Accordingly, by screwing a conductive screw into a bridging hole 66, that conductive screw will bridge the split S and create a continuous conductive element without an isolated segment.

Figure 6:
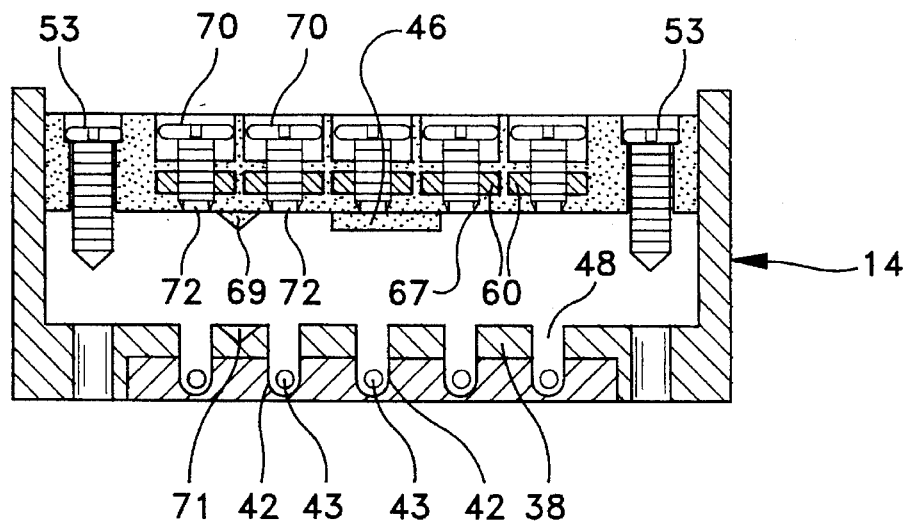
FIG. 6 is a cross-sectional view of the present invention of FIG. 1, viewed along section line 6—6.

Referring to FIG. 6, it can be seen that a locking projection 69 extends from the bottom surface 67 of the master insert 16. The locking projection 69 passes into a sympathetically formed relief 71 formed in the base 38 of the box structure 14. The presence of the locking projection 69 and the relief 71 ensures that the master insert 16 will be properly oriented within the box structure 14. Similarly, a cable gripping device 46 is projected at both ends of the lower surface of the master insert 16, to lock the cable in place as the screws in the holes 53 are tightened to secure the master insert into the box.

Conductive cutting screws 70 are selectively screwed through the enabling screw holes 55 in the top of the master insert 16. The conductive cutting screws 70 have sharpened hollow points 72 that are designed to easily cut into copper or other soft metals used in making electrical wire. If insulation and sheathing are present, the sharpened hollow points are capable of cutting through such materials and engaging the metal in the center of the wire. As the conductive cutting screws 70 are screwed into the master insert 16, they contact the conductive strips 60 within the master insert 16 by threading through the threaded apertures in the conductive strips. When advanced further, the conductive cutting screws 70 pass through the contact apertures 48 in the base 38 of the box structure 14 and bite into the wires 43 present in the wire apertures 42. In the shown embodiment, the wires 43 are stripped prior to insertion into the wire apertures 42. However, the wires 43 need not be stripped as long as the sharpened hollow point 72 of the cutting screw 70 is driven through the insulation on the wire.

The presence of the conductive cutting screw 70 electrically couples the various wires 43 in the base 38 of the box structure 14 to the various conductive strips 60 within the master insert 16. Accordingly, the selective placement of conductive cutting screws 70 can selectively couple the wires 43 to the conductive strips 60 as desired. As such, selected conductive strips 60 can be made to share the same electrical bias as selected wires 43.

Figure 7:
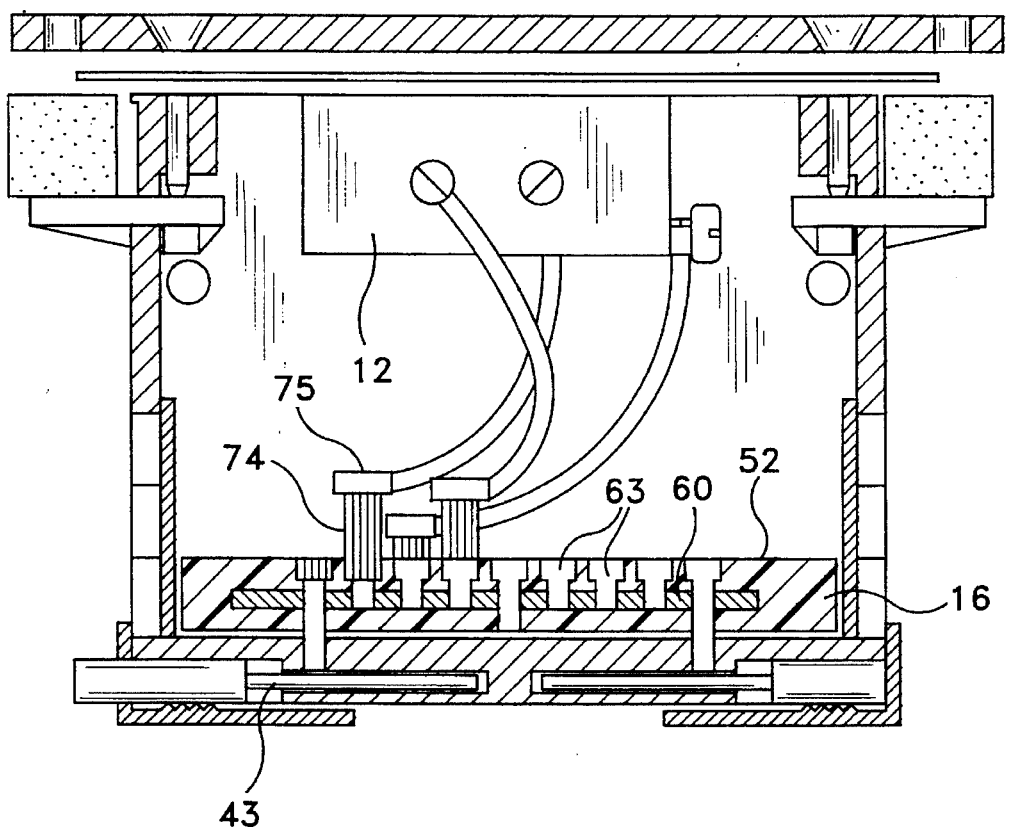
FIG. 7 is a cross-sectional view of the present invention of FIG. 1, viewed along section line 7—7.

Referring to FIG. 7, it can be seen that when selected conductive strips 60 in the master insert 16 are joined to the selected wires 43, the residential electrical outlet 12 can be connected to the master insert 16 and thus enabled. Conductive screws 74 with snap-on caps 75 are used to connect the various leads of the electrical outlet 12 to the master insert 16. The conductive screws 74 screw into the connector holes 63 on the top surface 52 of the master insert 16. The conductive screws 74 threadable engage the conductive strips 60 and therefore share the same electrical potential as the wire 43 coupled to the conductive strip 60. Accordingly, by connecting the leads of the electrical outlet 12 to the snap-on cap 75 of the conductive screws 74, the outlet 12 is enabled without the need for tape, solder or wire nuts.

Second Embodiment

Figure 8:
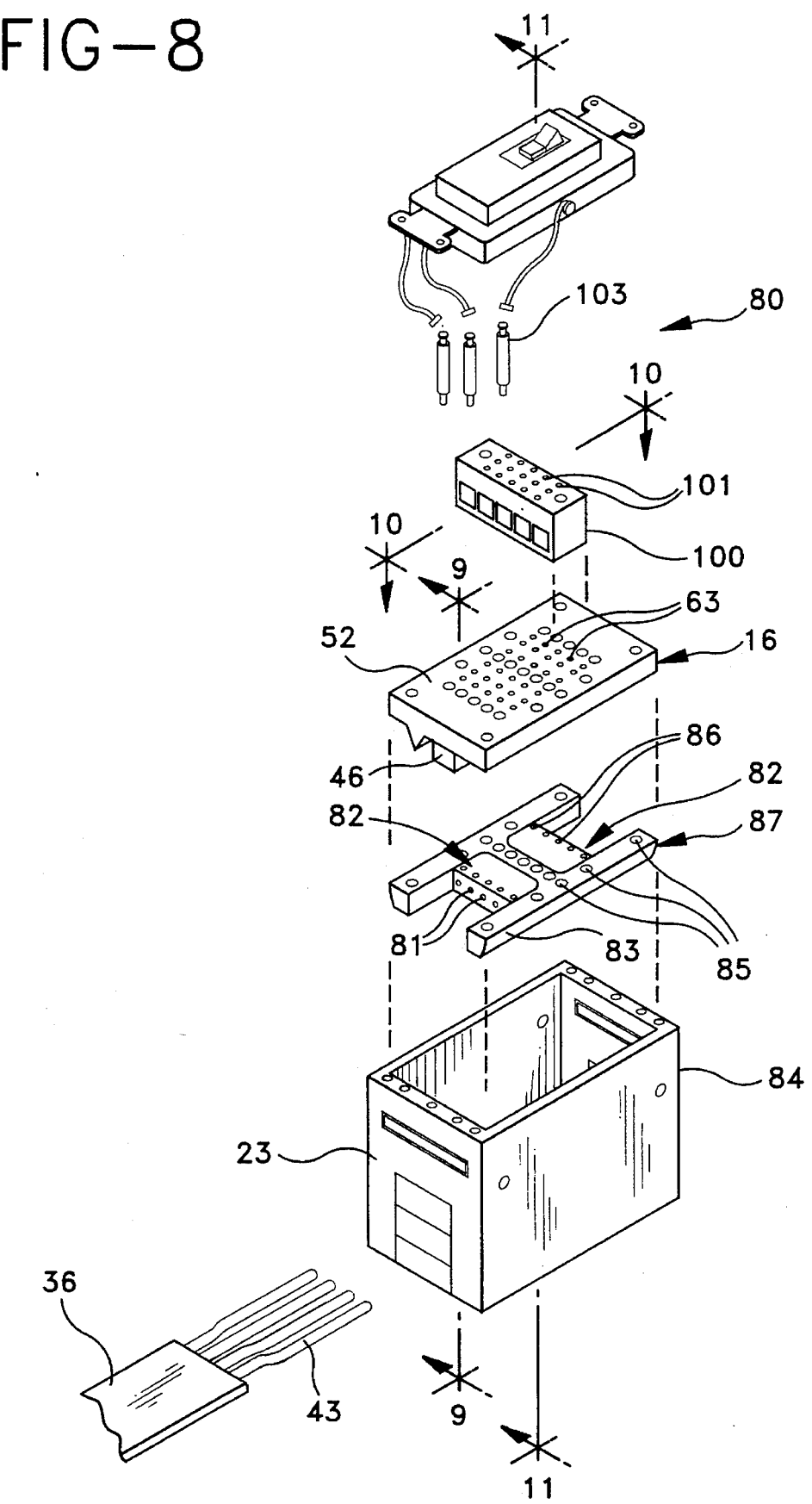
FIG. 8 shows an exploded perspective view of a first alternate embodiment of the present invention.

Referring to FIG. 8, an alternate embodiment of the present invention electrical box assembly 80 is shown. The elements of this embodiment that are the same as in the previous embodiment of FIG. 1 will be identified utilizing the same reference numbers.

Figure 9:
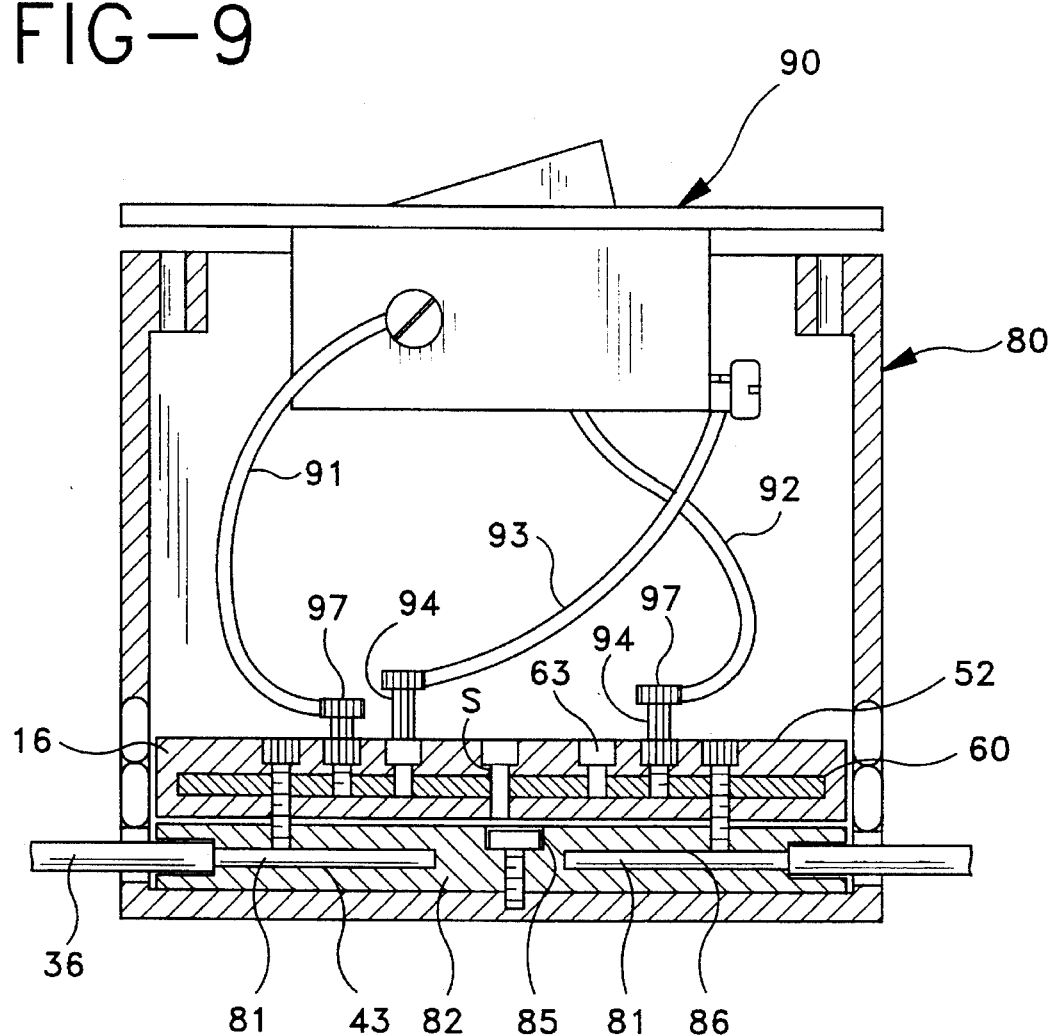
FIG. 9 is a cross-sectional view of the present invention of FIG. 8, viewed along section line 9—9.

In the shown embodiment, there are no wire apertures formed in the base of the box structure 84. Instead, the incoming electric cable 36 enters the box structure 84 through the lowest of the wire knock out openings present on the short end wall 23 of the box structure 84. Referring to FIG. 9 in conjunction with FIG. 8, it can be seen that the wires 43 from the electric cable 36 enter wire apertures 81 formed in a wire retaining insert 82. Two wire retaining inserts 82 are supported by an H-shaped structure. The H-shaped structure 87 has curved or beveled edges 83 to facilitate the insertion and removal of the H-shaped structure 87 and its associated wire retaining inserts 82 from the box structure 84. Large apertures 85 are formed through the H-shaped structure 87 that enable the H-shaped structure 87 and the two wire retaining inserts 82 to be attached to the base of the box structure 84 with screws. In the preferred embodiment, the apertures 85 on the H-shaped structure 87 align with the large holes 53 on the master insert 16.

Accordingly, the screws that attach the master cylinder 16 to the box structure 14 can also attach the H-shaped structure 87 to the box structure 14.

Contact apertures 86 are disposed on each of the wire retaining inserts 82. The contact apertures 86 extend into the below lying wire apertures 81 that contain the various cable wires 43. The master insert 16 lays across each of the wire retaining inserts 82 within the box structure 84. Accordingly, the enabling screw holes 55 (FIG. 4) align over the contact apertures 86 in the same manner that the enabling screw holes aligned over the base of the box structure 34 in the previous embodiment of FIG. 1.

It will therefore be understood that the various conductive strips 60 within the master insert 16 can be electrically coupled to the wires 43 of the electrical cable 36 by passing conductive screws through the enabling screw holes 55 on the master insert 16 and into the contact apertures 86 of the wire retaining insert 80.

In FIG. 9, a single pole switch 90 is assembled into the present invention electrical box assembly 80. As can be seen, both the black-in wire 91 and the black-out wire 92 are joined to the same conductive strip 60 within the master insert 16. A short is prevented by not placing a bridging screw across the gap space S (see FIG. 6). In FIG. 9, the wire leads 91, 92 and 93 join to the master insert 16 via snap head fasteners 94. These wire leads will be routinely supplied as color coded, flexible, braided wires in four to six inch lengths. Each of the wire leads 91, 92, 93 includes a snap type element 97 that is soldered onto the end of each of the wire leads. These snap type elements 97 can then be quickly snapped onto the tops of the snap head fasteners 94 creating the desired electrical interconnections.

Figure 10:
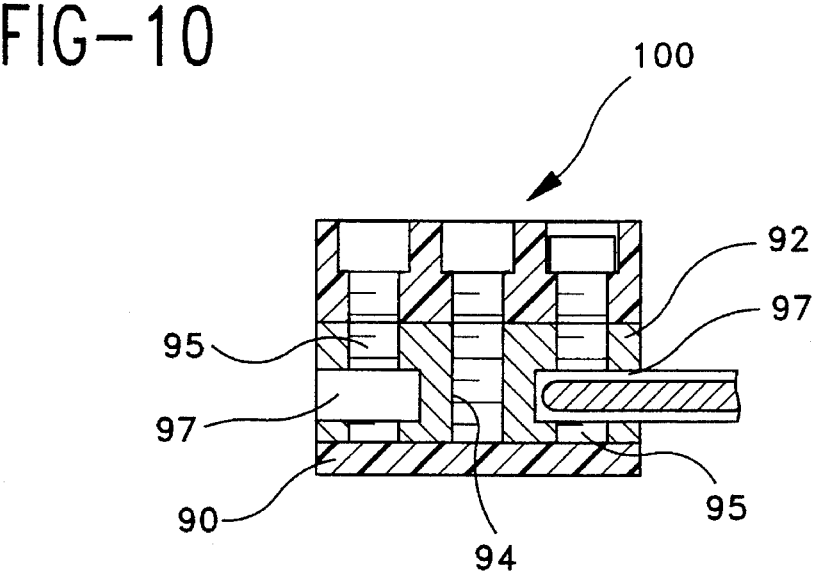
FIG. 10 is a cross-sectional view of the optional secondary insert shown in FIG. 8, viewed along section line 10—10.
Figure 11:
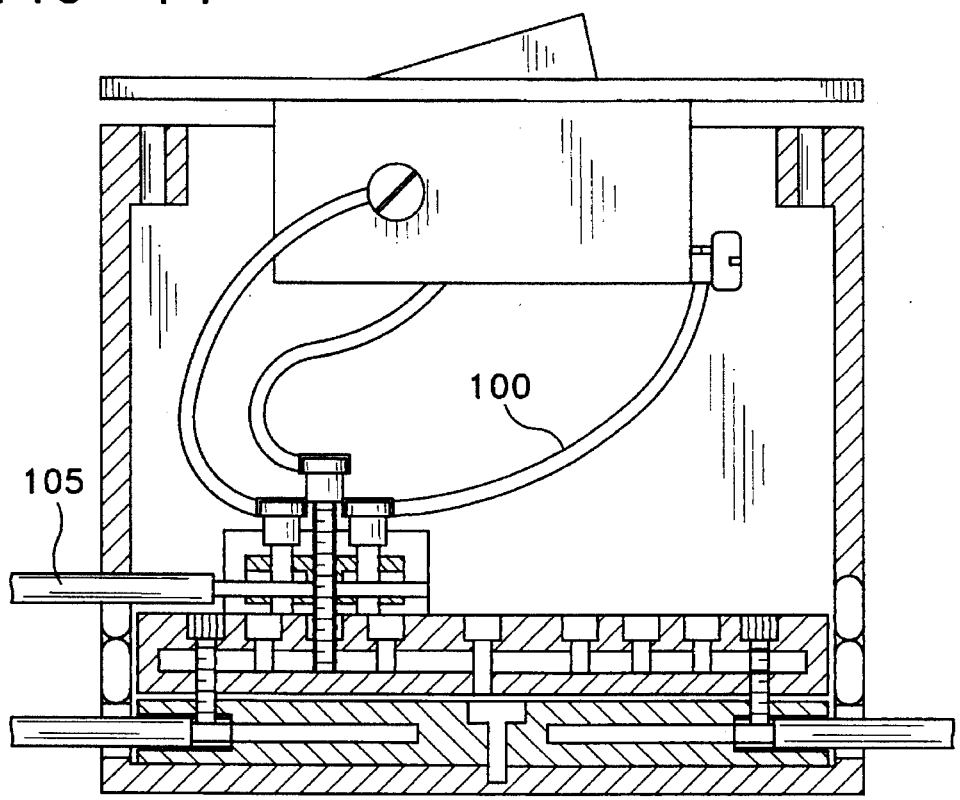
FIG. 11 is a cross-sectional view of the present invention of FIG. 8, viewed along section line 11—11 and including the optional secondary insert.

Returning to FIG. 8, an optional secondary insert 100 is shown. The secondary insert 100 is a structure having multiple screw holes 101 formed therethrough that align with the connector holes 63 (FIG. 4) on the top surface 52 of the master insert 16. Each of the screw holes 101 on each row are electrically interconnected. However, each row is electrically insulated from the other rows. By placing a long screw 103 into any one of the screw holes 101 on a given row, that row can be electrically coupled to the conductive strip 60 (FIG. 5) within the master insert 16 that is aligned below the secondary insert 100. Referring to FIG. 10 it can be seen that the secondary insert 100 is made of a dielectric material and defines a plurality of openings 90. In each of the openings 90 is a conductive member 92. The conductive member 92 has a threaded central aperture 94. Two threaded side apertures 95 are also present, wherein a wire opening 97 intersects each of the side apertures 95 at a perpendicular. Referring to FIG. 11 in conjunction with FIG. 8, it can be seen that a through circuit with an intermediate switch connection can be created by joining the electrical switch leads to the secondary insert 100 and also coupling a separate wire lead 105 to the secondary insert 100.

Figure 12:
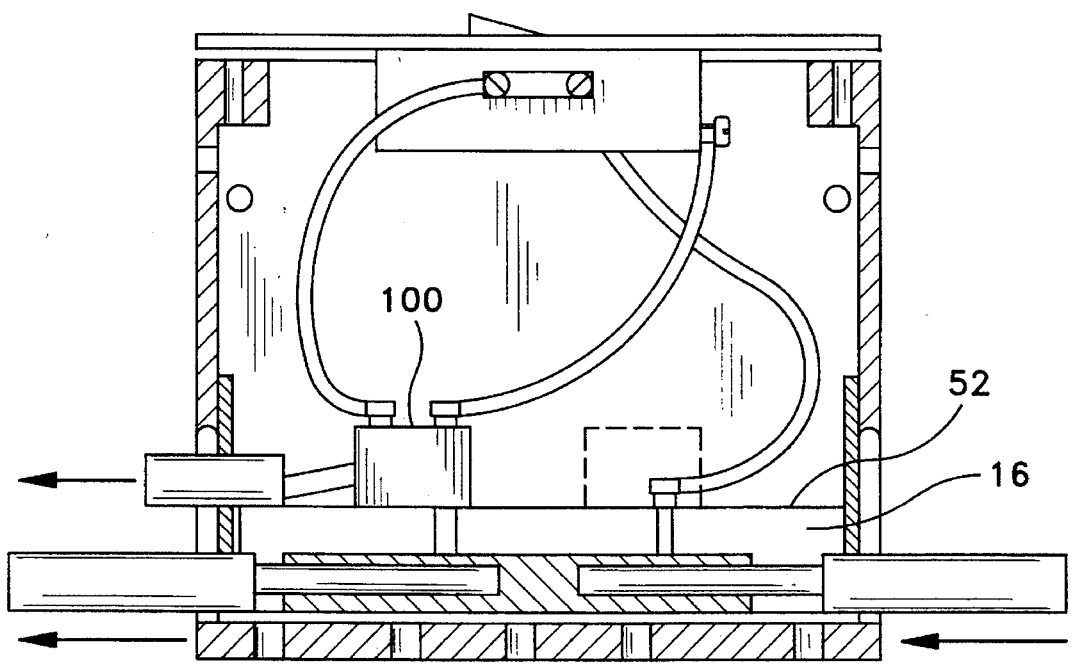
FIG. 12 is a cross-sectional view of a second alternative embodiment of the present invention.
Figure 13:
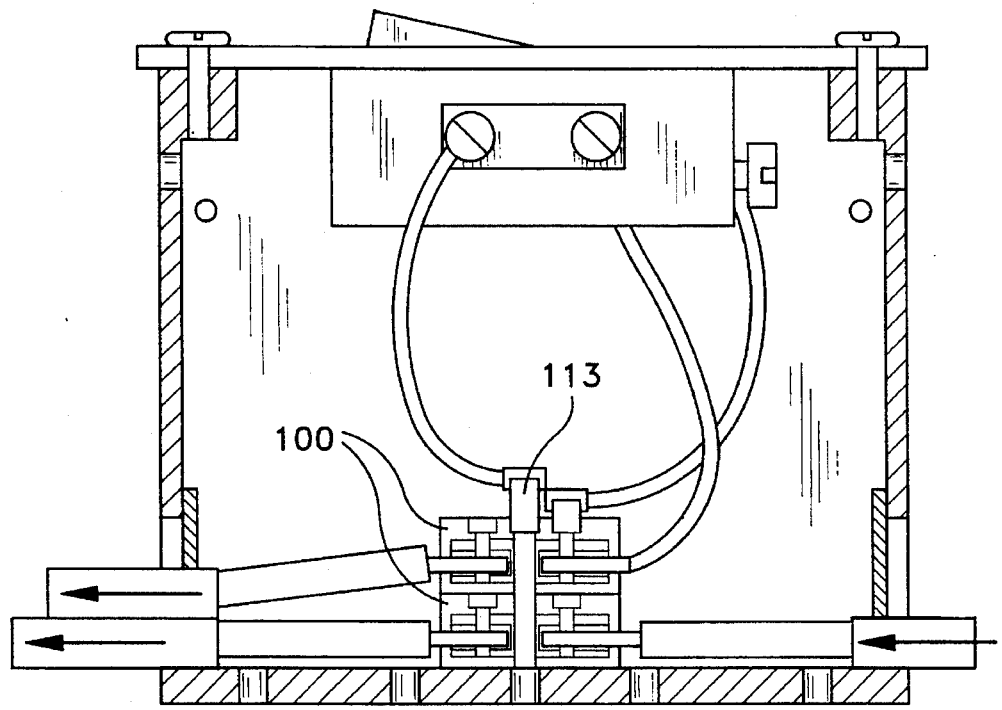
FIG. 13 is a cross-sectional view of a third alternative embodiment of the present invention.

Referring to FIG. 12, the secondary insert 100 is shown joined onto the top surface 52 of the master insert 16 so as to form an electrical outlet box with a through power configuration. In FIG. 13, two secondary inserts 100 are mounted atop one another to provide a through circuit with an intermediate switch connection. In this configuration, a special selectively insulated screw 113 is used to connect the two secondary inserts 100, thereby preventing the conductive portions of the secondary inserts 100 from shorting.

Figure 14:
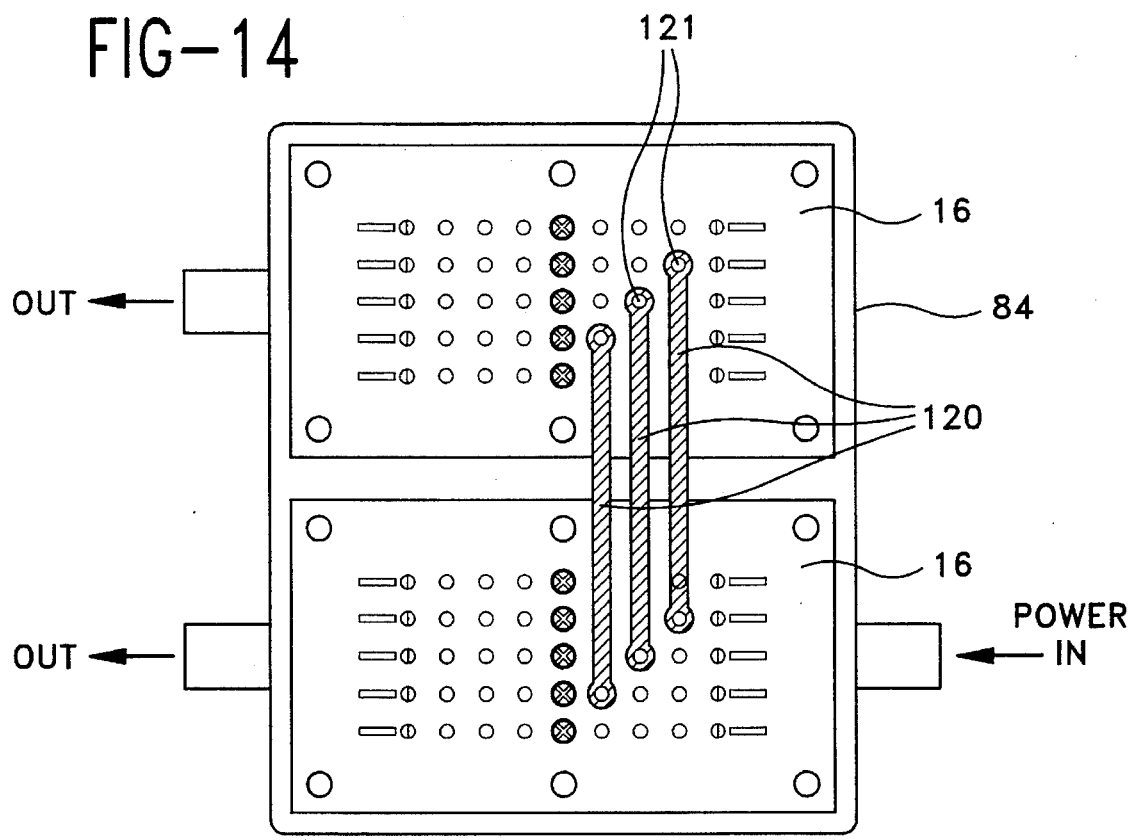
FIG. 14 is a top view of a forth alternative embodiment of the present invention used as a junction box.

Referring to FIG. 14, a double gang box 48 for two switches, four outlets, or two outlets and a switch, shows how jumper wires can expand the master inserts to two or more gang boxes. In this embodiment, master inserts 16 are positioned within each of the box structures 84 and conductive leads 120 are used to selectively join the two master inserts 16. The conductive leads are coupled to the master inserts via conductive screws 121 that screw into the master inserts 16 and engage the conductive elements contained within the master inserts 16.

Although the described embodiments of the present invention are believed to represent the best mode of the present invention, it should be understood that many described components of the present invention have known functional equivalents. Additionally, orientations, proportions and shapes used within the description may be modified by a person skilled in the art. More particularly, although the present invention shows a simple square wiring box, many other configurations can be used and the invention so practiced. All such modifications and deviations are intended to be covered by the scope of the invention as set forth in the appended claims.

What is claimed is:

1. A wiring box assembly for an electrical fixture, comprising:

a box structure having a retaining means therein for retaining a plurality of wires from an incoming cable at a set position and orientation;

an insert positionable within said box structure, said insert including a plurality of conductive elements disposed therein;

coupling means for electrically coupling each of said plurality of wires to one of said plurality of conductive elements;

connecting means for selectively connecting the electrical fixture to said plurality of conductive elements, thereby selectively coupling the electrical fixture to the plurality of wires from the incoming cable and electrically enabling the electrical fixture.

2. The assembly according to claim 1, wherein said box structure has a bottom surface and said retaining means includes apertures disposed in said bottom surface into which the plurality of wires pass, said apertures retaining the plurality of wires in said set position and orientation.

3. The assembly according to claim 2, wherein said retaining means includes a cover that is selectively connectable to said box structure, wherein said cover has locking teeth thereon that engage said cable thereby retaining the plurality of wires in said set position and orientation.

4. The assembly according to claim 1, wherein said retaining means is a dielectric member positionable within said box structure, said dielectric member having apertures disposed therein that are adapted to receive the plurality of wires, whereby said apertures retain the plurality of wires in said set position and orientation.

5. The assembly according to claim 1, wherein said insert is a dielectric structure having said plurality of conductive elements disposed therein, said dielectric structure having a plurality of threaded holes thereon that extend through said dielectric structure and said plurality of conductive elements within said dielectric structure.

6. The assembly according to claim 5, wherein said retaining means aligns said plurality of wires at said set position and orientation that corresponds in position to said threaded holes in said insert, whereby said threaded holes in said insert are aligned over the plurality of wires in said retaining means.

7. The assembly according to claim 6, wherein said coupling means includes a threaded member that screws into one of said plurality of threaded holes in said insert, wherein said threaded member contacts one of said plurality of conductive elements in said insert and contacts one of the plurality of wires in said retaining means, thereby electrically coupling one of the plurality of wires to one of said plurality of conductive elements.

8. The assembly according to claim 7, wherein said connecting means includes a screw element threaded through one of said plurality of threaded holes that leads to the same conductive element contacted by said threaded member, whereby said screw element is electrically coupled to said contact member and the wire said threaded member engages.

9. The assembly according to claim 7, wherein said threaded member has a first end that engages one of the plurality of wires, said first end having a sharpened end that cuts into the wire, thereby enabling said threaded member to electrically engage the wire regardless of whether the wire is covered by insulation.

10. The assembly according to claim 5, wherein said insert includes threaded bores disposed in between adjacent conductive elements of said plurality of conductive elements, wherein the adjacent conductive elements can be selectively joined by placing a conductive threaded member in each of said threaded bores, whereby said threaded member engages and electrically couples said adjacent conductive elements.

11. The assembly according to claim 5, further including a second insert, wherein said second insert is adapted to receive secondary wires introduced into said box structure, said second insert being selectively joinable to said plurality of conductive elements in said insert, whereby said secondary wires are electrically coupled to said plurality of conductive elements.

12. A method of wiring the leads of an electrical fixture to a plurality of wires in a wiring box assembly, comprising the steps of:

providing a wiring box;

leading said plurality of wires into said wiring box;

orienting said plurality of wires into a set orientation within said wiring box;

positioning a plurality of conductive elements over said plurality of wires;

coupling each of said plurality of wires to a corresponding one of said plurality of conductive elements; and coupling the leads of the electrical fixture to said plurality of conductive elements.

13. The method according to claim 12, wherein said step of orienting said plurality of wires includes positioning each of said plurality of wires into receptacles within said wiring box.

14. The method according to claim 12, wherein said step of coupling each of said plurality of wires to a corresponding one of said plurality of conductive elements includes the substeps of driving a threaded member through at least one of said plurality of conductive elements, wherein said threaded member contacts a corresponding one of said plurality of wires.

15. The method according to claim 14, further including the substep of driving said threaded member into the corresponding one of said plurality of wires.

16. The method according to claim 12, wherein said plurality of conductive elements are disposed in a dielectric insert and said step of positioning includes placing said dielectric insert in said box structure.

17. The method according to claim 14, wherein said step of coupling the leads of the electrical fixture includes coupling at least one of the leads to said threaded member.

18. The method according to claim 12, further including the step of adjoining adjacent conductive elements of said plurality of conductive elements by driving a threaded member between said adjacent conductive elements.

* * * * *